No. 641,609. Patented Jan. 16, 1900.
C. L. RYMAL.
BICYCLE STANDING ATTACHMENT.
(Application filed May 11, 1899.)
(No Model.)
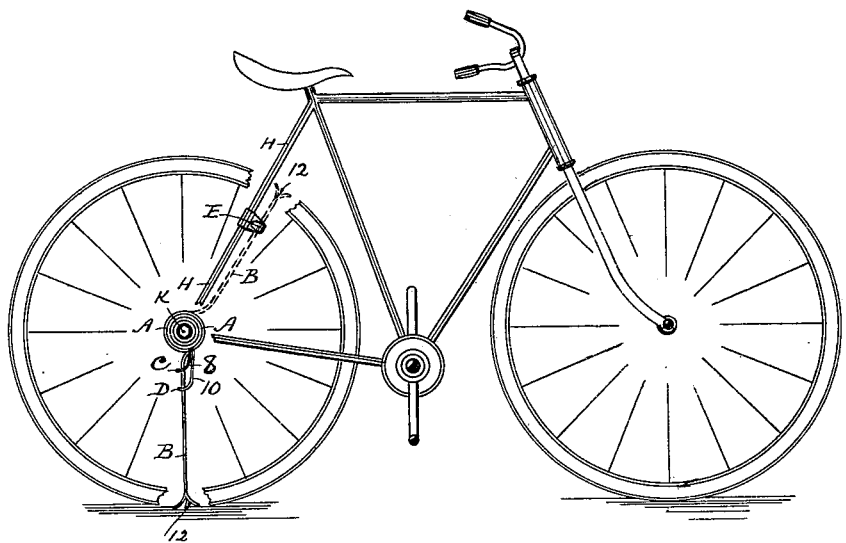
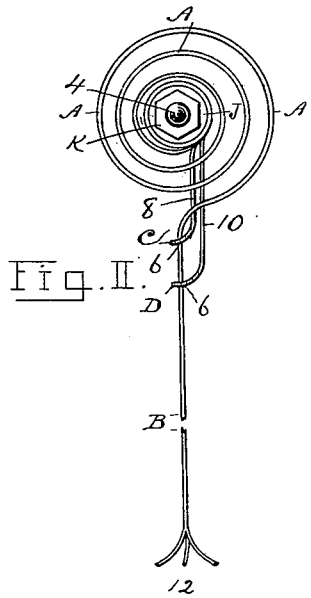
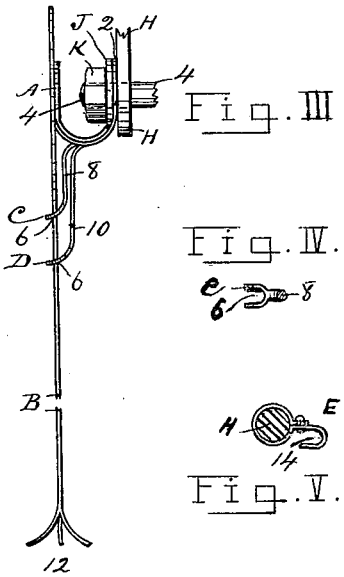
Witnesses.
B. E. Herald
Jas. A. Harvey
Inventor
Clarence L. Rymal
by John H. Hendry
Atty.
THE NORRIS PETERS CO., PHOTO-LITHO., WASHINGTON, D. C.

UNITED STATES PATENT OFFICE.

CLARENCE L. RYMAL, OF HAMILTON, CANADA.

BICYCLE-STANDING ATTACHMENT.

SPECIFICATION forming part of Letters Patent No. 641,609, dated January 16, 1900.

Application filed May 11, 1899. Serial No. 716,428. (No model.)

*To all whom it may concern:*

Be it known that I, CLARENCE L. RYMAL, a citizen of Canada, residing at Hamilton, in the county of Wentworth, in the Province of Ontario, Canada, have invented new and useful Improvements in Adjustable Bicycle-Standing Attachments, of which the following is a specification.

My invention relates to an adjustable bicycle-standing attachment in which the central eye part of a coil or scroll-shaped steel-wire spring is inwardly extended and secured to the outer part of the rigid axle of the rear drive-wheel of a bicycle, the outer end of said wire spring extending far enough downward in locked position to stand the bicycle. Said extended end is capable when unlocked of rising by its inherent resiliency to a horizontal position and then brought upward to and in line with the rear-fork brace of the bicycle and locked thereto.

The objects of my invention are, first, to provide a device which may be easily and permanently attached to a bicycle for standing the same, and, second, to afford facilities for raising the device to a locked position that shall in no manner interfere with the proper riding of the bicycle. I attain these objects by the mechanism illustrated in the accompanying drawings, in which—

Figure 1 is a side elevation of my improved adjustable bicycle-standing device secured in standing and locked position to the rigid axle of the rear wheel of an ordinary bicycle, parts of which are broken away in order not to interfere with the comprehension of the device, and to avoid complexity the device is also shown in upper locked position in broken lines. Fig. 2 is an enlarged side elevation of the device in standing and locked position, the end of the axle, with securing nut, being shown in the central part, the bicycle being removed. Fig. 3 is an elevation of the same as viewed from the front, showing attachment to the axle and the rear-fork brace, both of which are broken. Fig. 4 is a plan of the lower lock and of the stay, showing rear opening to receive the extended leg part of the scroll to lock the same in standing position; and Fig. 5 is a plan of the upper locking device which is secured to the rear-fork brace of the bicycle, as shown in section.

Similar letters and numerals refer to similar parts throughout the several views.

In the drawings the steel scroll part of this bicycle-standing attachment is indicated by A, its downwardly-extended leg by B, its lock by C, having arm 8, its lower stay by D, having arm 10, and its upper lock and support by E. The central part 2 of this device is extended at the inner side and has an eye to fit on the rear rigid axle 4 of a bicycle and against the rear-fork brace H thereof, and secured thereto by a washer J and nut K in permanent position. This central and inner extended part of the scroll A may be of single or of double formation and arranged to allow sufficient space for the nut between the scroll proper and its central inward part. The inherent resiliency of the scroll-spring, when unlocked, would bring the leg B to about horizontal position or parallel with the bicycle. Therefore when the leg is positioned, as shown, in the rear openings 6 of the lock C and of the lower stay D, both of which form rigid parts thereof, the leg is firmly held in said openings by its own inherent resiliency, as the tendency of the leg is to bound forwardly upward to horizontal position, as previously mentioned. It will be observed that there is an upward spring also to the leg on account of the scroll formation of the upper part. This spring tendency is advantageous to the bicycle, avoiding rigidity and sudden jars.

When the leg is brought forwardly upward to the rear-fork brace H of the bicycle, it is lodged in the rear opening 14, formed in the lock E, which is bent toward the rear. This lock E is secured to said brace H in approved manner. The said opening 14 of this lock E is forwardly closed, the tendency of the leg being to press forwardly downward of its own accord. This inherent resiliency contained in this bicycle-standing attachment, as set forth, is the important element in the construction thereof. It will be noticed that the openings in the said locks and lower stay are all forwardly closed, of necessity, to perform their proper functions.

This bicycle device is shown attached to the right-hand side of a bicycle. The said device may be attached to either side, the results being identical, no matter on which side of the bicycle the device may be attached.

Various changes in the form, sizes, and proportions of my invention may be resorted to without departing from the spirit and scope thereof. Hence what I claim as my invention, and desire to secure by Letters Patent, is—

1. An adjustable bicycle-standing attachment of the character described, consisting of a scroll or coil spring, a lower lock, a lower stay and a lock attached to the rear-fork brace, the central part of said spring inwardly extended and formed with a central eye to fit on the rear-wheel axle and secured thereto and against the rear-fork brace by a washer and nut, the outer fore part of said spring extending downward with extended foot and secured by its own inherent resiliency against the forwardly-closed ends of the lower lock and the lower stay forming a part of the spring, said leg capable by its own inherent resiliency of locking in the lock attached to the rear-fork brace of the bicycle.

2. An adjustable bicycle-standing attachment of the character described, consisting of a scroll-spring, a lower lock, a lower stay and a lock attached to the rear-fork brace, the central part of said spring extending inwardly and formed with a central eye to fit on the rear wheel-axle against the rear-fork brace and fastened thereto by the axle-nut, the outer and rear part of said spring extended downward as a leg and secured in the lower lock and in the lower stay, forming a part of said spring by its own inherent resiliency against the forwardly-closed openings in said lock and stay, said leg capable of being secured by means of its inherent resiliency in the lock of the rear brace.

CLARENCE L. RYMAL.

Witnesses:
JOHN H. HENDRY,
B. E. HERALD.